United States Patent
Noda

(10) Patent No.: US 10,843,126 B2
(45) Date of Patent: Nov. 24, 2020

(54) SEPARATION MEMBRANE STRUCTURE AND NITROGEN CONCENTRATION REDUCTION METHOD

(71) Applicant: NGK INSULATORS, LTD., Nagoya (JP)

(72) Inventor: Kenichi Noda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 315 days.

(21) Appl. No.: 15/631,504

(22) Filed: Jun. 23, 2017

(65) Prior Publication Data
US 2017/0291135 A1    Oct. 12, 2017

Related U.S. Application Data

(63) Continuation of application No. PCT/JP2016/052535, filed on Jan. 28, 2016.

(30) Foreign Application Priority Data

Jan. 30, 2015    (JP) .................................. 2015-017580
Sep. 30, 2015    (JP) .................................. 2015-193080

(51) Int. Cl.
B01D 53/22    (2006.01)
B01D 69/12    (2006.01)
(Continued)

(52) U.S. Cl.
CPC ....... B01D 53/228 (2013.01); B01D 67/0046 (2013.01); B01D 67/0051 (2013.01);
(Continued)

(58) Field of Classification Search
CPC ...... B01D 53/22; B01D 53/228; B01D 69/02; B01D 69/10; B01D 69/12; B01D 71/028;
(Continued)

(56) References Cited

U.S. PATENT DOCUMENTS

| 5,989,316 A | 11/1999 | Kuznicki et al. |
| 10,446,357 B2 * | 10/2019 | Douglass ............... H01H 85/18 |

(Continued)

FOREIGN PATENT DOCUMENTS

| CN | 104144738 A | 11/2014 |
| JP | 2000-312824 A1 | 11/2000 |

(Continued)

OTHER PUBLICATIONS

"Database of Zeolite Structures", Structure Commission of the International Zeolite Association, 2017, 1 page. Retrieved from http://asia.iza-structure.org/IZA-SC/material_tm.php?STC=AFX on Mar. 26, 2020. (Year: 2017).*

(Continued)

*Primary Examiner* — Jason M Greene
(74) *Attorney, Agent, or Firm* — Burr & Brown, PLLC

(57) ABSTRACT

A separation membrane structure comprises a porous support body, a zeolite membrane formed on the porous support body and comprising pores having a major diameter and a minor diameter. The ratio of a major diameter to a minor diameter is greater than 1.0. The minor diameter is greater than or equal to 0.30 nm and less than or equal to 0.35 nm.

9 Claims, 2 Drawing Sheets

(51) Int. Cl.
*B01D 69/02* (2006.01)
*B01D 67/00* (2006.01)
*B01D 71/02* (2006.01)
*C01B 39/02* (2006.01)

(52) U.S. Cl.
CPC ............. *B01D 69/02* (2013.01); *B01D 69/12* (2013.01); *B01D 71/028* (2013.01); *B01D 2256/245* (2013.01); *B01D 2257/102* (2013.01); *B01D 2323/12* (2013.01); *B01D 2325/02* (2013.01); *C01B 39/02* (2013.01)

(58) Field of Classification Search
CPC ........ B01D 2256/245; B01D 2257/102; B01D 2325/02; B01D 2325/021
See application file for complete search history.

(56) References Cited

U.S. PATENT DOCUMENTS

| | | | | |
|---|---|---|---|---|
| 2005/0139066 A1* | 6/2005 | Miller | ................... | B01D 53/228 95/45 |
| 2010/0290963 A1* | 11/2010 | Andersen | ........... | B01D 53/9418 423/213.2 |
| 2012/0012001 A1* | 1/2012 | Li | ........................ | B01D 53/228 95/54 |
| 2012/0135215 A1* | 5/2012 | McEvoy | .............. | B01D 71/028 428/220 |
| 2014/0271422 A1* | 9/2014 | Tang | ................... | B01D 53/9418 423/212 |
| 2014/0360939 A1 | 12/2014 | Yamada et al. | | |
| 2015/0273401 A1* | 10/2015 | Miller | ................... | B01D 71/028 210/500.25 |
| 2016/0114313 A1* | 4/2016 | Xie | ...................... | B01D 53/228 423/213.2 |
| 2016/0343531 A1* | 11/2016 | Douglass | ................ | H01H 85/18 |
| 2017/0259214 A1* | 9/2017 | Onozuka | ................ | B01D 69/12 |

FOREIGN PATENT DOCUMENTS

| | | | |
|---|---|---|---|
| JP | 2001-526109 | A1 | 12/2001 |
| JP | 2013-146722 | A1 | 8/2013 |
| JP | 2013-226535 | A1 | 11/2013 |
| JP | 2014-039896 | A1 | 3/2014 |
| JP | 2014-111258 | A1 | 6/2014 |
| JP | 2014-240345 | A1 | 12/2014 |
| WO | 2014/084861 | A1 | 6/2014 |

OTHER PUBLICATIONS

Ting Wu, et al., "Influence of Propane on $CO_2/CH_4$ and $N_2/CH_4$ Separations in Cha Zeolite Membranes," *Journal of Membrane Science*, vol. 473 (2015), pp. 201-209.

J. van den Bergh, et al., "Separation and Permeation Characteristics of a DD3R Zeolite Membrane," *Journal of Membrane Science*, vol. 316 (2008), pp. 35-45.

Lloyd M. Robeson, "The Upper Bound Revisited," *Journal of Membrane Science*, vol. 320 (2008), pp. 390-400.

International Search Report and Written Opinion (Application No. PCT/JP2016/052535) dated Mar. 8, 2016.

English translation of International Preliminary Report on Patentability (Application No. PCT/JP2016/052535) dated Aug. 10, 2017.

Chinese Office Action (with English translation), Chinese Application No. 201680004415.3, dated Aug. 5, 2019 (13 pages).

Chinese Office Action, Chinese Application No. 201680004415.3, dated Sep. 19, 2020 (7 pages).

* cited by examiner

SEPARATION MEMBRANE STRUCTURE AND NITROGEN CONCENTRATION REDUCTION METHOD

BACKGROUND OF THE INVENTION

1. Field of the Invention

The present invention relates a nitrogen reduction method and a separation membrane structure configured to separate methane and nitrogen.

2. Description of Related Art

Various methods have been proposed for the purpose of separating methane and nitrogen.

For example, there has been proposal of a means for adsorption and removal of nitrogen by use of a pressure swing adsorption method using a molecular sieve of activated carbon (reference is made to Patent Literature 1), or a means of adsorption and removal of nitrogen by a pressure swing adsorption method using ETS-4 in which cations are exchanged to barium (reference is made to Patent Literature 2).

Furthermore a means for separating nitrogen by a membrane separation method respectively using a CHA-type zeolite membrane, a DDR-type zeolite membrane or an organic membrane is also known (reference is made to Non-Patent Literature 1 to 3).

CITATION LIST

Patent Literature

[Patent Literature 1] Japanese Patent Application Laid-Open No. 2000-312824
[Patent Literature 2] Published Japanese Translation No. 2001-526109 of the PCT International Application

Non-Patent Literature

[Non-Patent Literature 1] Ting Wu et al. (6 others), "Influence of propane on $CO_2/CH_4$ and $N_2/CH_4$ separations in CHA zeolite membranes" Journal of Membrane Science, 473 (2015) 201-209.
[Non-Patent Literature 2] J. van den Bergh et al. (4 others), "Separation and permeation characteristics of a DD3R zeolite membrane", Journal of Membrane Science, 316 (2008) 35-45.
[Non-Patent Literature 3] Lloyd M. Robeson, "The upper bound revisited", Journal of Membrane Science, 320 (2008) 390-400.

SUMMARY OF THE INVENTION

Technical Problem

However, since the molecular diameter of methane is close to the molecular diameter of nitrogen the means discussed above have not reached sufficient separation performance in particular under high pressure conditions.

The present invention is proposed based on the new insight above, and has the object of providing a nitrogen reduction method and a separation membrane structure that can efficiently separate methane and nitrogen even under high pressure conditions.

Solution to Problem

The separation membrane structure according to the present invention comprises a porous support body, and a zeolite membrane formed on the porous support body and comprising pores having a major diameter and a minor diameter. The ratio of the major diameter to the minor diameter is greater than 1.0. The minor diameter is greater than or equal to 0.30 nm and less than or equal to 0.35 nm.

Advantageous Effects of Invention

According to the present invention, it is possible to provide a nitrogen concentration reduction method and a separation membrane structure configured to efficiently separate methane and nitrogen.

DETAILED DESCRIPTION OF THE INVENTION

Figure 1:
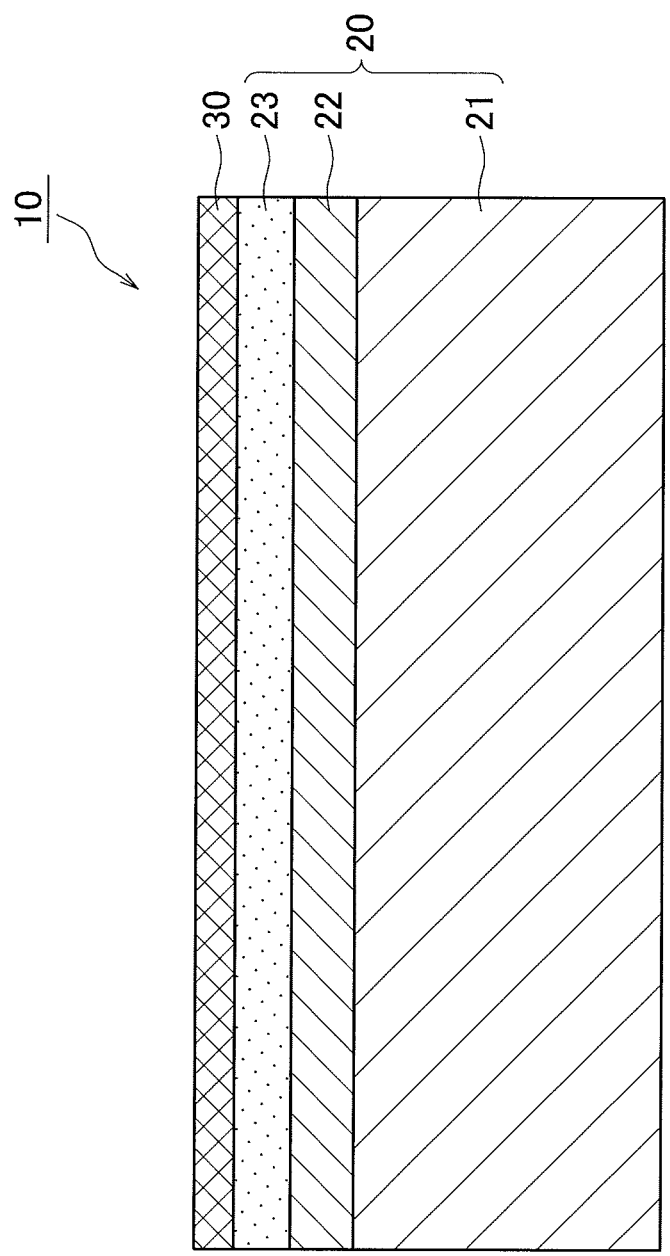
FIG. 1 is a cross-sectional view of a separation membrane structure.

An embodiment of the present invention will be described below making reference to the figures. Those aspects of configuration in the following description of the figures that are the same or similar are denoted by the same or similar reference numerals. However, the figures are merely illustrative, and the actual ratios or the like of the respective dimensions may differ.

Configuration of Separation Membrane Structure 10

FIG. 1 is a cross-sectional view of a separation membrane structure 10. The separation membrane structure 10 enables selective permeation of nitrogen in a mixed gas that contains at least methane molecule (referred to below as "methane") and nitrogen molecule (referred to below as "nitrogen"). The separation membrane structure 10 includes a porous support body 20 and a zeolite membrane 30.

The porous support body 20 supports the zeolite membrane 30. The porous support body 20 exhibits chemical stability that enables the formation (crystallization, coating, or precipitation) of the zeolite membrane 30 in a membrane configuration on a surface.

The porous support body 20 may be configured in a shape to enable supply a mixed gas that contains at least methane and nitrogen to the zeolite membrane 30. The shape of the porous support body 20 for example may be configured in a honeycomb, monolithic, flat, tubular, cylindrical, columnar, square column shape, or the like.

The porous support body 20 according to the present embodiment has a substrate 21, an intermediate layer 22 and a surface layer 23.

The substrate 21 is configured from a porous material. The porous material includes for example, a sintered ceramic, a metal, an organic polymer, glass, carbon or the like. The sintered ceramic includes alumina, silica, mullite, zirconia, titania, yttria, silicon nitride, silicon carbide, or the like. The metal includes aluminum, iron, bronze, stainless steel, or the like. The organic polymer includes polyethylene, polypropylene, polytetrafluoroethylene, polysulfone, polyimide or the like.

The substrate 21 may include an inorganic binder. The inorganic binder may include use of at least one of titania, mullite, sinterable alumina, silica, glass frits, clay minerals, and sinterable cordierite.

The average pore diameter of the substrate 21 may be configured as 0.5 microns to 25 microns. The average pore diameter of the substrate 21 can be measured using a mercury porosimeter. The porosity of the substrate 21 may be configured for example as 25% to 50%. The average particle diameter of the porous material that configures the substrate 21 may be configured for example as 5 microns to 100 microns. In the present embodiment, the term "average particle diameter" denotes the value of the arithmetic mean for the maximum diameter of 30 measured particles that are measured by cross sectional micro-structure observation by use of a scanning electron microscope (SEM).

The intermediate layer 22 is formed on the substrate 21. The intermediate layer 22 can be configured by the porous material that can be used in the substrate 21. The average pore diameter of the intermediate layer 22 may be smaller than the average pore diameter of the substrate 21, and may be configured for example as 0.005 microns to 2 microns. The average pore diameter of the intermediate layer 22 may be measured by a perm-porometer or a nano perm-porometer depending on the size of the pore diameter. The porosity of the intermediate layer 22 may be configured as 20% to 60%. The thickness of the intermediate layer 22 may be configured for example as 30 microns to 300 microns.

The surface layer 23 is formed on the intermediate layer 22. The surface layer 23 can be configured by the porous material that can be used in the substrate 21. The average pore diameter of the surface layer 23 may be smaller than the average pore diameter of the intermediate layer 22, and may be configured for example as 0.001 microns to 1 micron. The average pore diameter of the surface layer 23 may be measured by a perm-porometer or a nano perm-porometer depending on the size of the pore diameter. The porosity of the surface layer 23 may be configured to 20% to 60%. The thickness of the surface layer 23 for example may be configured as 1 micron to 50 microns.

The zeolite membrane 30 is formed on the porous support body 20 (more specifically, on the surface layer 23). Although there is no particular limitation in relation to the thickness of the zeolite membrane 30, it may be configured for example as 0.1 micron to 10 microns. When the zeolite membrane 30 has a thick configuration, there is a tendency for nitrogen separation performance to be enhanced, and when the zeolite membrane 30 has a thin configuration, there is a tendency for the nitrogen permeation rate to increase.

Figure 2:
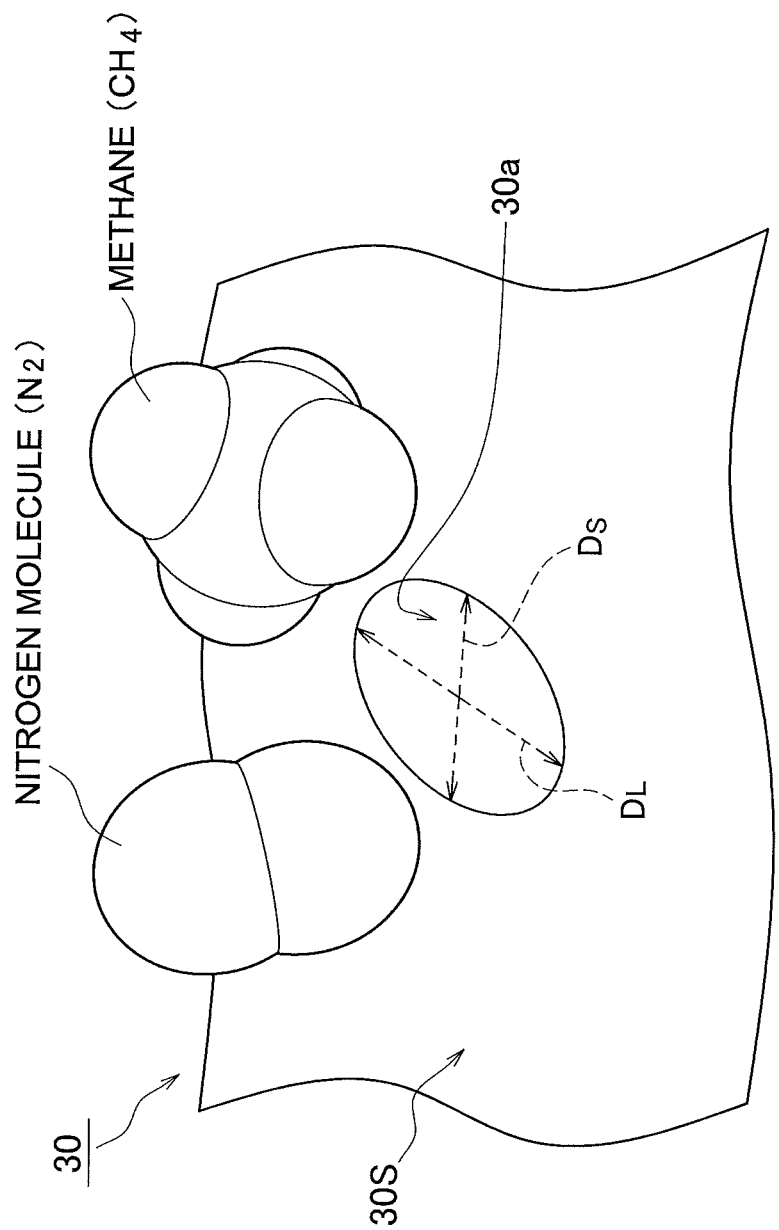
FIG. 2 is an enlarged perspective view of the surface of the separation membrane.

FIG. 2 is an enlarged perspective view of a surface 30S of the zeolite membrane 30. The zeolite membrane 30 includes plural pores 30a that open onto the surface 30S. The respective pores 30a extend from the surface 30S towards the porous support body 20. The respective pores 30a are connected from the surface 30S up to the interface of the zeolite membrane 30 and the porous support body 20. It is noted that FIG. 2 only illustrates one pore 30a.

The shape of the opening of the pore 30a on the surface 30S is not perfectly circular. As a result, the pore 30a has a major diameter $D_L$ and a minor diameter $D_S$. The major diameter $D_L$ is the maximum diameter of the pore 30a (the maximum value of the distance between oxygen atoms). The minor diameter $D_S$ is the diameter of the pore 30a in a direction that is substantially perpendicular to the major diameter $D_L$. The major diameter $D_L$ is greater than the minor diameter $D_S$. Therefore the ratio of the major diameter $D_L$ to the minor diameter $D_S$ (major diameter $D_L$/minor diameter $D_S$) is greater than 1.0. It is preferred that the ratio of the major diameter $D_L$ to the minor diameter $D_S$ is greater than or equal to 1.1. Entry of nitrogen under pressure conditions into the pore 30a is promoted as the ratio of the major diameter $D_L$ to the minor diameter $D_S$ becomes greater than 1.0. The ratio of the major diameter $D_L$ to the minor diameter $D_S$ is preferably less than or equal to 2.0, and more preferably less than or equal to 1.8. When the ratio of the major diameter $D_L$ to the minor diameter $D_S$ has a configuration of less than or equal to 2.0, since deformation of the pores is inhibited, penetration of methane into the pores can be inhibited. The feature "not perfectly circular" includes an overall flat star polygonal shape.

When the framework that forms the pores of the zeolite is configured as a ring of less than or equal to an n-membered ring of oxygen, the major diameter and the minor diameter of the n-membered ring of oxygen are respectively denoted as the major diameter $D_L$ and the minor diameter $D_S$. The n-membered ring of oxygen denotes a configuration in which a through hole (channel) is formed, and does not include a configuration in which a through hole is not formed. The n-membered ring of oxygen is also referred to simply as an n-membered ring in which the number of oxygen atoms that configure the framework that forms the pores is taken to be a number n, in which at least one of a Si atom, Al atom and P atom is included, and which is a moiety that forms a ring structure in which the respective oxygen atoms are bound with a Si atom, an Al atom, a P atom, or the like. For example, when the zeolite has pores formed from an oxygen 8-membered ring, an oxygen 6-membered ring, an oxygen 5-membered ring, and an oxygen 4-membered ring (that is to say, only has pores that are formed by a ring that is less than or equal to an oxygen 8-membered ring), the major diameter and the minor diameter of the 8-membered ring of oxygen are respectively denoted as the major diameter $D_L$ and the minor diameter $D_S$.

Furthermore, when the zeolite has plural types of oxygen n-membered ring pores having equal values for n, the major diameter and the minor diameter of the n-membered ring of oxygen that has the greatest minor diameter are respectively denoted as the major diameter $D_L$ and the minor diameter $D_S$. For example, when the zeolite only has pores formed from rings that are less than or equal to an oxygen 8-membered ring, and when there is plural types of oxygen 8-membered ring pores, the major diameter and the minor diameter of the 8-membered ring of oxygen that has the greatest minor diameter are respectively denoted as the major diameter $D_L$ and the minor diameter $D_S$.

The minor diameter $D_S$ of the pore 30a is greater than or equal to 0.30 nm and less than or equal to 0.35 nm. In consideration of the permeation rate of nitrogen, the minor diameter $D_S$ is preferably greater than or equal to 0.31 nm. Although there is no particular limitation on the major diameter $D_L$, a value of 0.43 or more is preferred in light of the permeation rate of nitrogen, and a value of less than or equal to 0.55 nm is preferred in light of the separation performance of nitrogen.

When a pressurized mixed gas (for example about 1 MPa) containing at least methane and nitrogen is brought into contact with the surface 30S of the zeolite membrane 30 described above, the nitrogen that has an overall elongated shape expands the opening and can enter into the pore 30a. However, methane that has an overall spherical shape is impeded from expanding the opening and entering into the pore 30a. The nitrogen that enters into the pore 30a is pushed by nitrogen that enters in order into the pore 30a and displaces towards the porous support body 20. In this manner, the zeolite membrane 30 causes selectively permeation of nitrogen from a mixed gas that contains methane and nitrogen.

The major diameter $D_L$ and the minor diameter $D_S$ are uniquely defined by the framework structure. The framework structures (types) of a zeolite membrane 30 that satisfies the relationship for the major diameter $D_L$ and the minor diameter $D_S$ as described above for example includes ABW, AEN, AFN, AFV, AFX, AHT, APC ATV, AVL, CDO, CGS, DAC, ESV, GIS, HEU, IHW, IRN, LTJ, MVY, OWE, PAR, SAT, UEI, WEI, YUG, or the like. The major diameter $D_L$ and the minor diameter $D_S$ of the respective framework structures may be calculated based on the values disclosed in The International Zeolite Association (IZA) "Database of Zeolite Structures" [online], [searched Jan. 22, 2015], Internet <URL: http://www.iza-structure.org/databases/>.

The molar ratio of Si atoms, Al atoms, and P atoms in the zeolite membrane 30 preferably satisfies at least one of Si/Al≥3.0 or P/Al≤1.5, and more preferably satisfies at least one of Si/Al≥8.0 or P/Al≤1.2. When at least one of Si/Al≥3.0 or P/Al≤1.5 is satisfied, the water resistant properties of the zeolite membrane are enhanced and the effect of moisture can be inhibited thereby enabling efficient separation of methane and nitrogen. An element other than Si, Al, P and O may be included in the zeolite membrane 30.

Method of Manufacturing Separation Membrane Structure

A method of manufacturing the separation membrane structure 10 will be described.

(1) Formation of Porous Support Body 20

Firstly, starting materials for the substrate 21 are molded into a desired shape by use of extrusion molding, a press molding method, a slip cast method, or the like to thereby form a green body for the substrate 21. Next, the green body for the substrate 21 is fired (for example, 900 degrees C. to 1450 degrees C.) to thereby form the substrate 21.

Then, an intermediate layer slurry is prepared by use of a ceramic starting material having a desired particle diameter, and the intermediate layer slurry is formed as a membrane on a surface of the substrate 21 to thereby form a green body for the intermediate layer 22. Next, the green body for the intermediate layer 22 is fired (for example, at 900 degrees C. to 1450 degrees C.) and to thereby form the intermediate layer 22.

Then, a surface layer slurry is prepared by use of a ceramic starting material having a desired particle diameter, and the surface layer slurry is formed as a membrane on a surface of the intermediate layer 22 to thereby form a green body for the surface layer 23. Next, the green body for the surface layer 23 is fired (for example, at 900 degrees C. to 1450 degrees C.) and to thereby form the surface layer 23.

The porous support body 20 is formed in the above manner.

(2) Formation of Zeolite Membrane 30

A zeolite membrane 30 is formed on a surface of the porous support body 20. The zeolite membrane 30 may be formed using a known and conventional method depending on the type of framework structure.

Firstly, after pre-coating zeolite as a seed crystal on the surface of the surface layer 23, the porous support body 20 is immersed inside a pressure-resistant vessel containing a starting material solution that includes a silica source, an alumina source, an organic template, an alkali source and water or the like.

Next, the pressure-resistant vessel is placed in a drying oven and subjected to thermal processing (hydrothermal synthesis) for about 1 to 240 hours at 100 to 200 degrees C. to thereby form a zeolite membrane. Next, the porous support body 20 formed the zeolite membrane is washed and dried at 80 to 100 degrees C.

Then, when an organic template is included in the starting material solution, the porous support body 20 is placed in an electric furnace, and heated in an atmosphere of air at a temperature of 400 to 800 degrees C. for 1 to 200 hours to thereby combust and remove the organic template.

It is noted that reference may be made to conventional information in relation to the starting material solution composition, or the thermal processing conditions, or the like. For example, an HEU-type zeolite can be synthesized making reference to Japanese Patent Application Laid-Open No. 2000-237584. Furthermore, a GIS-type zeolite can be synthesized making reference to Japanese Patent Application Laid-Open No. 2011-111337.

Method of Nitrogen Reduction

A method of reducing the nitrogen concentration by use of the separation membrane structure 10 will be described.

A mixed gas that contains at least methane and nitrogen is supplied to a zeolite membrane 30 under a pressure of 1 MPa. At that time, although nitrogen can expand and enter the opening of the pore 30a, methane is impeded from entering into the pore 30a.

As a result, the nitrogen concentration in the mixed gas is reduced causing a concentration of methane. More specifically, it is possible to reduce the molar concentration of nitrogen in a mixed gas to less than or equal to 50% of the initial value when supplying a mixed gas at 1 MPa to a zeolite membrane 30 that has a minor diameter $D_S$ of greater than or equal to 0.30 nm and less than or equal to 0.35 nm.

There is no limitation to 1 MPa in relation to the pressure of the mixed gas, and a configuration of greater than or equal to 1 MPa is possible. When the pressure resistant properties of the membrane are considered, a value of less than or equal to 10 MPa is preferred. The pressure of the mixed gas can be adjusted to a predetermined value as required.

Operation and Effect

The separation membrane structure 10 according to the above embodiment includes the porous support body 20, and a zeolite membrane 30 formed on the porous support body 20 and comprising pores 30a having a major diameter $D_L$ and a minor diameter $D_S$. The ratio of the major diameter $D_L$ to the minor diameter $D_S$ is greater than 1.0. The minor diameter $D_S$ is greater than or equal to 0.30 nm and less than or equal to 0.35 nm.

Therefore, when a pressurized mixed gas that contains at least methane and nitrogen is supplied, it is possible to efficiently separate methane and nitrogen due to selective permeation of nitrogen resulting from a molecular sieve effect in the zeolite membrane 30.

OTHER EMBODIMENTS

Although an embodiment of the present invention has been described, the present invention is not limited to the above embodiment, and various modifications are possible within a scope that does not depart from the spirit of the invention.

For example, although the porous support body 20 includes the substrate 21, the intermediate layer 22 and the surface layer 23, one or both of the intermediate layer 22 and the surface layer 23 may be omitted.

Furthermore, although the separation membrane structure 10 includes the zeolite membrane 30 stacked onto the porous support body 20, a functional layer or protective layer may be further provided in a stacked configuration onto the zeolite membrane 30. This type of functional layer or protective layer may be an inorganic layer such a zeolite layer, carbon layer, silica layer, or the like, or may be an organic layer such as a polyimide layer, silicone layer or the like. Furthermore, the functional layer or protective layer stacked onto the separation membrane 30 may include addition of a metal cation or metal complex that exhibits a tendency to adsorb nitrogen in comparison to methane.

EXAMPLES

The examples of the present invention will be described below. However, the present invention is not thereby limited to the following examples.

Preparation of Separation Membrane Structure

A separation membrane structure according to Sample No. 1 to No. 12 is prepared in the following manner.

Firstly, a tube-shaped porous alumina substrate having a diameter of 10 mm and a length of 30 mm is prepared. The pore diameter that opens onto an outer surface of the porous alumina substrate is 0.1 microns.

Next, the various types of zeolite powders shown in Table 1 are synthesized using known methods. More specifically, there is synthesis of a CDO zeolite powder according to Sample No. 1 (reference is made to Japanese Patent Application Laid-Open No. 2008-137856), a IHW zeolite powder according to Sample No. 2 (reference is made to Journal of American Chemical Society, 127, 11560-11561 (2005)), an ATV zeolite powder according to Sample No. 3 (reference is made to Inorganic Chemistry, 40(23), 5812-5817 (2001)), a SAT zeolite powder according to Sample No. 4 (reference is made to Journal of the Chemical Society, Dalton Transactions, 1997, 4485-4490), a GIS zeolite powder according to Sample No. 5 (reference is made to Japanese Patent Application Laid-Open No. 2011-111337), an ABW zeolite powder according to Sample No. 6 (reference is made to Japanese Patent Application Laid-Open No. 2012-87000), an AFX zeolite powder according to Sample No. 7 (reference is made to Chemistry of Materials, 8(10), 2409-2411 (1996)), a CGS zeolite powder according to Sample No. 8 (reference is made to Microporous and Mesoporous Materials, 28(1), 163-172, (1999)), an HEU zeolite powder according to Sample No. 9 (reference is made to Japanese Patent Application Laid-Open No. 2000-237584), a CHA zeolite powder according to Sample No. 10 (reference is made to Japanese Patent Application Laid-Open No. 2013-126649), an RHO zeolite powder according to Sample No. 11 (reference is made to Ceramics International, 39, 7149-7158 (2013)), and an MFI zeolite powder according to Sample No. 12 (reference is made to Japanese Patent Application Laid-Open No. 2012-81437).

Next, the zeolite powder is coated onto an outer surface of the porous alumina substrate. The porous alumina substrate is immersed in a synthesis sol used for the synthesis of the zeolite powder and a zeolite membrane is formed by hydrothermal synthesis. Table 1 shows the molar ratio of Si/Al and the molar ratio of P/Al based on the molar number of Si atoms, Al atoms and P atoms in the various types of zeolite membranes.

Next, the organic template is combusted and removed from those samples in Sample No. 1 to No. 12 that use an organic template.

Next, one end of the porous alumina substrate is sealed by adhering a glass plate with an epoxy resin to one end of the porous alumina substrate. Then, a glass tube is connected with an epoxy resin to the other end of the porous alumina substrate. In this manner, the separation membrane structure according to Sample No. 1 to No. 12 is completed.

Gas Separation Testing

Gas separation testing is performed by use of the separation membrane structure in Sample No. 1 to 12.

Firstly after sufficiently drying the separation membrane structure, a mixed gas of nitrogen and methane (molar ratio 1:1) is supplied to an outer side of the separation membrane structure at a temperature of 23 degrees C. and a pressure of 1 MPa.

Next the composition and flow amount of a permeating gas that permeates the zeolite membrane and flows out of the glass tube is analyzed. The flow amount of the permeating gas is measured using a mass flow meter. The composition of the permeating gas is measured using gas chromatography. The composition and flow amount of the permeating gas are used to calculate a permeation rate of methane and nitrogen per unit membrane surface area·unit pressure difference·unit membrane thickness, and (nitrogen permeation rate)/(methane permeation rate) is taken to be the nitrogen separation performance. Table 1 shows an evaluation of the nitrogen separation performance into A, B, C, D from highest to lowest, and evaluates the nitrogen permeation rate into A, B, C from highest to lowest.

A supplied gas including addition of water vapor (100 ppm) to the mixed gas above is supplied to an outer side of the separation membrane structure at a temperature of 23 degrees C. and a pressure of 1 MPa.

The flow amount of permeating gas that permeates the zeolite membrane and flows out from the glass tube is measured using a mass flow meter. The permeating gas reduction ratio is taken to be (flow amount of permeating gas without addition of water vapor−flow amount of permeating gas with addition of water vapor)/(flow amount of permeating gas without addition of water vapor). In Table 1, configurations in which the water vapor resistance increases as the permeating gas reduction ratio decreases are evaluated as A, B, and C from high to low in order of water vapor resistance.

TABLE 1

| Sample No. | Zeolite Type | Minor Diameter (nm) | Major Diameter (nm) | Major Diameter/ Minor Diameter | Si/Al | P/Al | Nitrogen Separation Performance | Nitrogen Permeation Rate | Water Vapor Resistance |
|---|---|---|---|---|---|---|---|---|---|
| 1 | CDO | 0.31 | 0.47 | 1.52 | ∞ | — | A | B | A |
| 2 | IHW | 0.35 | 0.43 | 1.23 | ∞ | — | A | B | A |
| 3 | ATV | 0.30 | 0.49 | 1.63 | — | 1.0 | A | B | A |
| 4 | SAT | 0.30 | 0.55 | 1.83 | — | 1.2 | A | B | A |
| 5 | GIS | 0.31 | 0.45 | 1.45 | 1.0 | — | A | B | C |
| 6 | ABW | 0.34 | 0.38 | 1.12 | 1.0 | — | A | C | C |
| 7 | AFX | 0.34 | 0.36 | 1.06 | — | 0.9 | A | C | A |

TABLE 1-continued

| Sample No. | Zeolite Type | Minor Diameter (nm) | Major Diameter (nm) | Major Diameter/ Minor Diameter | Si/Al | P/Al | Nitrogen Separation Performance | Nitrogen Permeation Rate | Water Vapor Resistance |
|---|---|---|---|---|---|---|---|---|---|
| 8 | CGS | 0.35 | 0.81 | 2.31 | — | ∞ | B | B | C |
| 9 | HEU | 0.31 | 0.75 | 2.42 | 3.5 | — | B | B | B |
| 10 | CHA | 0.38 | 0.38 | 1.00 | 8.0 | — | C | A | A |
| 11 | RHO | 0.36 | 0.36 | 1.00 | 3.0 | — | C | B | B |
| 12 | MFI | 0.53 | 0.56 | 1.06 | ∞ | — | D | A | A |

As shown in Table 1, the nitrogen separation performance is enhanced in Sample Nos. 1 to 9 in which the ratio of the major diameter to the minor diameter is greater than 1.0, and the minor diameter is greater than or equal to 0.30 nm and less than or equal to 0.35 nm.

Furthermore, among Sample No. 1 to No. 9, a further enhancement is enabled in relation to the nitrogen separation performance in Sample No. 1 to No. 7 in which the ratio of the major diameter to the minor diameter is greater than 1.0 and less than or equal to 2.

As shown in Table 1, the nitrogen permeation rate is enhanced in those samples in which the major diameter is greater than or equal to 0.43 nm and less than or equal to 0.55 nm.

As shown in Table 1, the water vapor resistance is enhanced in samples in which the molar ratio of Si/Al is greater than or equal to 3.0, and samples in which the molar ratio of P/Al is less than or equal to 1.5. Furthermore, the water vapor resistance is further enhanced in samples in which the molar ratio of Si/Al is greater than or equal to 8.0.

The invention claimed is:

1. A separation membrane structure configured for selective permeation of nitrogen from a mixed gas that contains at least methane and nitrogen, the separation membrane structure comprising:
    a porous support body, and
    a zeolite membrane formed on the porous support body, and comprising pores having a major diameter and a minor diameter,
    a ratio of the major diameter to the minor diameter is greater than 1.0,
    the minor diameter is greater than or equal to 0.30 nm and less than or equal to 0.35 nm,
    the zeolite membrane is formed in a membrane configuration consisting essentially of zeolite, and
    the zeolite membrane is formed of a zeolite selected from the group consisting of ABW, AFV, AHT, ATV, AVL, IHW, IRN, MVY, PAR, and SAT.

2. The separation membrane structure according to claim 1, wherein
    the ratio of the major diameter to the minor diameter is greater than 1.0 and less than or equal to 2.0.

3. The separation membrane structure according to claim 1, wherein
    the major diameter is greater than or equal to 0.43 nm and less than or equal to 0.55 nm.

4. The separation membrane structure according to claim 1, wherein
    a molar ratio of elements in the zeolite membrane satisfy at least one of Si/Al≥3.0 or P/Al≤1.5.

5. A separation membrane structure configured for selective permeation of nitrogen from a mixed gas that contains at least methane and nitrogen, the separation membrane structure comprising:
    a porous support body, and
    a zeolite membrane formed on the porous support body, and comprising plural types of pores respectively having a major diameter and a minor diameter,
    a ratio of the major diameter to the minor diameter is greater than 1.0 in a pore that has the greatest minor diameter of the plural types of pores,
    the minor diameter is greater than or equal to 0.30 nm and less than or equal to 0.35 nm in a pore that has the greatest minor diameter of the plural types of pores,
    the zeolite membrane is formed in a membrane configuration consisting essentially of zeolite, and
    the zeolite membrane is formed of a zeolite selected from the group consisting of AEN, AFN, APC, CGS, DAC, HEU, LTJ, OWE, UEI and WEI.

6. A nitrogen reduction method using a separation membrane structure according to claim 1, and comprising the step of supplying the mixed gas to the zeolite membrane at a pressure of greater than or equal to 1 MPa.

7. A nitrogen reduction method using a separation membrane structure according to claim 1, and comprising the step of reducing a molar concentration of nitrogen in a mixed gas to less than or equal to 50% of an initial value by supply of the mixed gas to the zeolite membrane.

8. The separation membrane structure according to claim 1,
    wherein the zeolite membrane is formed of a zeolite selected from the group consisting of ABW, ATV, IHW and SAT.

9. The separation membrane structure according to claim 5,
    wherein the zeolite membrane is formed of a zeolite selected from the group consisting of CGS and HEU.

* * * * *